US010320792B2

(12) United States Patent
Bao et al.

(10) Patent No.: US 10,320,792 B2
(45) Date of Patent: Jun. 11, 2019

(54) ON-DEMAND IDENTITY SERVICE FOR CONTENT

(71) Applicant: Verizon Patent and Licensing Inc., Arlington, VA (US)

(72) Inventors: Guanqun Bao, Sunnyvale, CA (US); Jae Won Chung, Lexington, MA (US); Gaurav Gupta, Fremont, CA (US); Saumitra Kumar, Sunnyvale, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 181 days.

(21) Appl. No.: 15/002,741

(22) Filed: Jan. 21, 2016

(65) Prior Publication Data

US 2017/0214693 A1     Jul. 27, 2017

(51) Int. Cl.
*H04L 29/06* (2006.01)
*H04L 29/08* (2006.01)
*G06Q 30/02* (2012.01)

(52) U.S. Cl.
CPC ......... *H04L 63/10* (2013.01); *G06Q 30/0277* (2013.01); *H04L 63/0428* (2013.01); *H04L 67/146* (2013.01); *H04L 67/22* (2013.01)

(58) Field of Classification Search
CPC ...... H04L 63/10; H04L 63/0428; H04L 67/22
USPC .......................................................... 713/168
See application file for complete search history.

(56) References Cited

U.S. PATENT DOCUMENTS

| | | | | |
|---|---|---|---|---|
| 2009/0171786 A1* | 7/2009 | Kuo | ........................ | G06Q 30/02 705/14.73 |
| 2009/0227246 A1* | 9/2009 | Guedalia | ............. | H04L 61/1594 455/419 |
| 2009/0260064 A1* | 10/2009 | McDowell | .............. | G06F 21/10 726/4 |
| 2011/0213969 A1* | 9/2011 | Nakhjiri | ................ | H04L 63/061 713/158 |
| 2012/0195412 A1* | 8/2012 | Smith | .................... | H04M 3/537 379/88.13 |
| 2014/0344804 A1* | 11/2014 | Ein-Gal | ..................... | G06F 8/61 717/178 |
| 2014/0373103 A1* | 12/2014 | Hirata | ..................... | G06F 21/31 726/4 |

(Continued)

OTHER PUBLICATIONS

Beltran, Identifying, authenticating, and authorizing smart objects and end users to cloud services in Internet of Things, May 2018, Elsevier, pp. 595-611 (Year: 2018).*

*Primary Examiner* — Taghi T Arani
*Assistant Examiner* — Gregory A Lane

(57) ABSTRACT

A device may receive a request for an authorization code, associated with providing content to a second device, from the second device. The device may provide the authorization code to the second device. The device may receive, from a third device, a request for a unique device identifier corresponding to the authorization code. The request for the unique device identifier may include the authorization code. The unique identifier may be associated with a subscriber of a network. The subscriber may be associated with the second device. The device may provide the unique device identifier to the third device. The third device may be associated with providing the content to the second device. The content may be targeted to the subscriber based on the unique device identifier.

20 Claims, 10 Drawing Sheets

(56) References Cited

U.S. PATENT DOCUMENTS

2015/0140960 A1* 5/2015 Powell .................... H04W 4/24
 455/406
2016/0127334 A1* 5/2016 Bangole .............. H04L 63/0428
 713/171

* cited by examiner

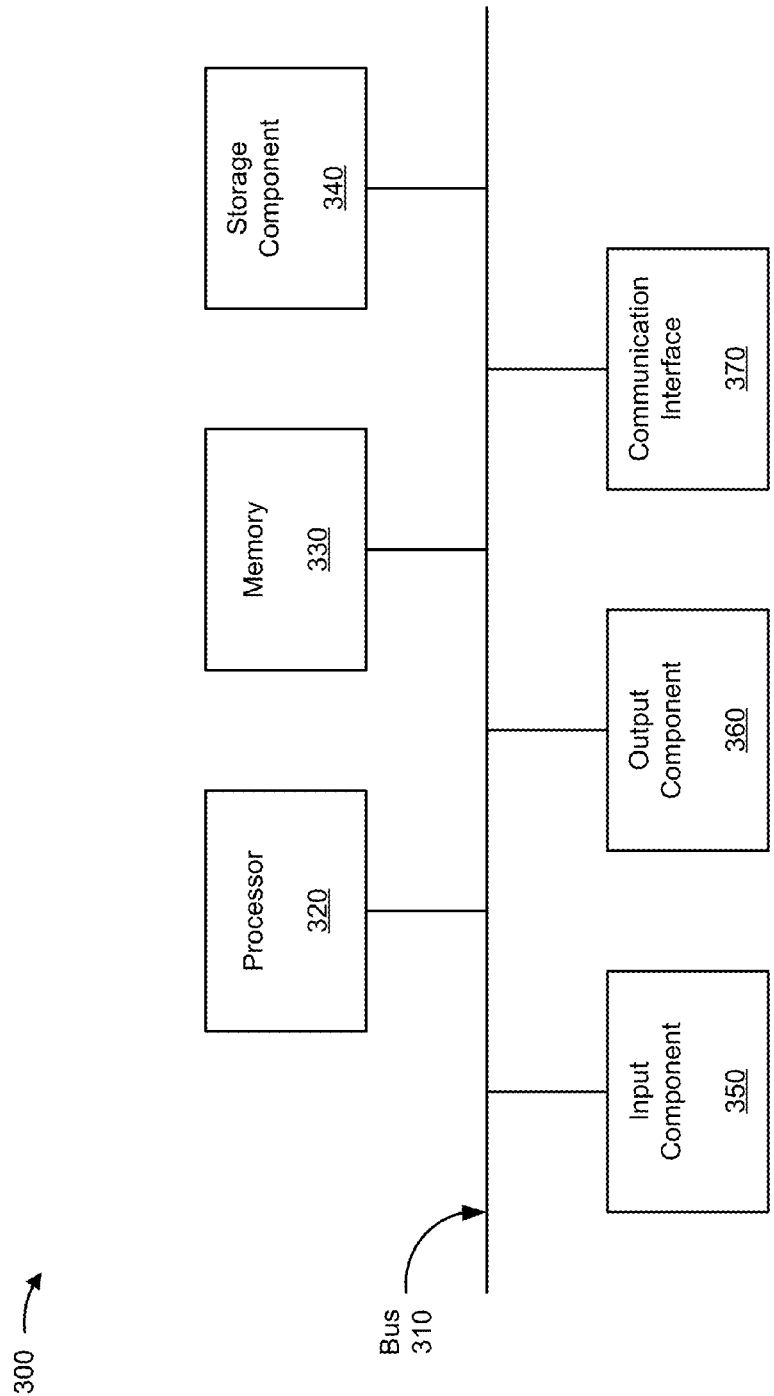

ON-DEMAND IDENTITY SERVICE FOR CONTENT

BACKGROUND

Operator networks transport network traffic associated with a variety of services, applications, and content. Content providers may provide services, applications, and/or content that users, associated with the operator network, cannot use and/or do not desire to receive (such as an advertisement in which a user is not interested). In efforts to remedy this, the content providers may provide services, applications, and/or content that are targeted to the users.

BRIEF DESCRIPTION OF THE DRAWINGS

FIG. 3 is a diagram of example components of one or more devices of FIG. 2;

DETAILED DESCRIPTION OF PREFERRED EMBODIMENTS

Figure 1A:
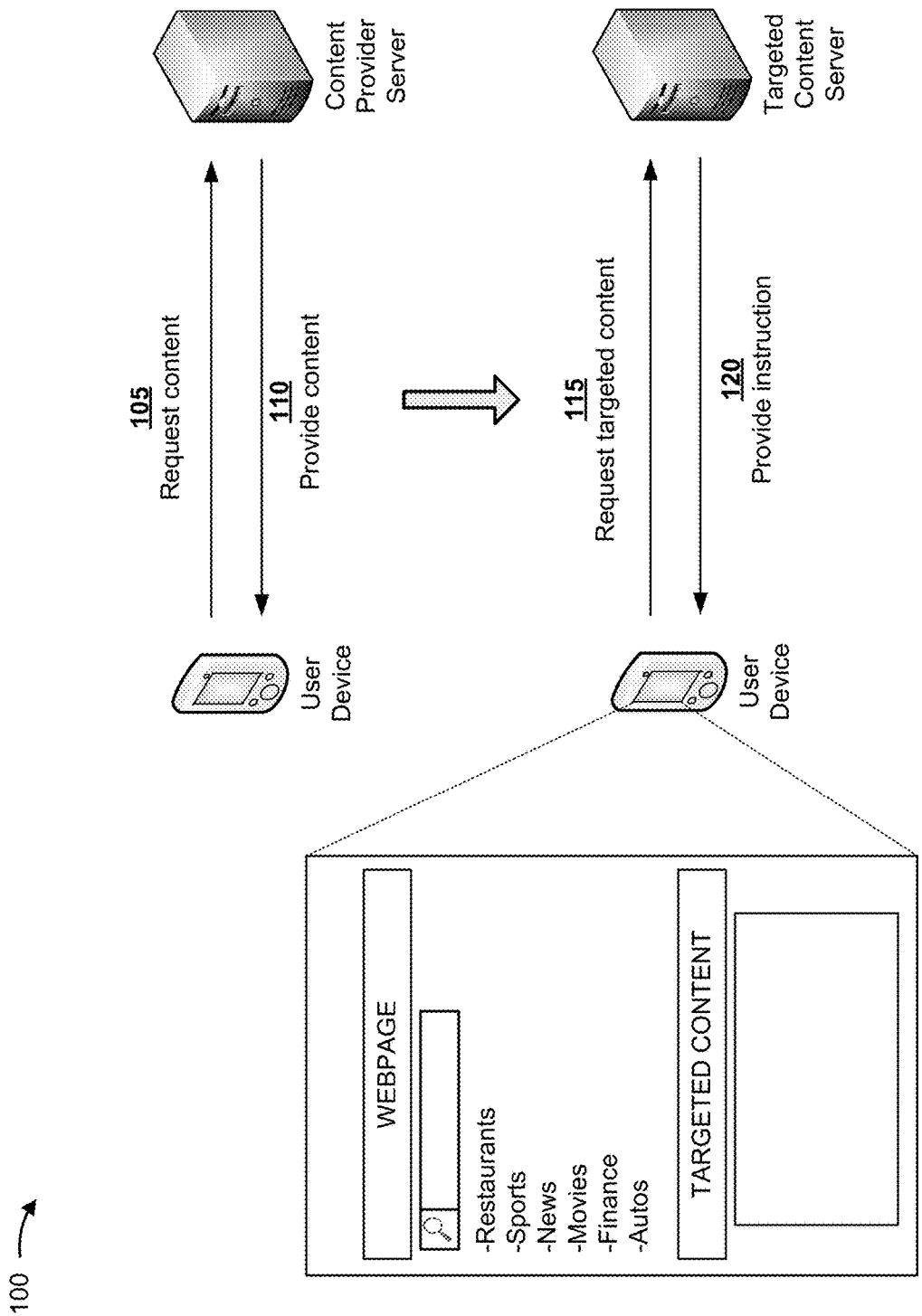
FIGS. 1A-1E are diagrams of an overview of an example implementation described herein.

The following detailed description of example implementations refers to the accompanying drawings. The same reference numbers in different drawings may identify the same or similar elements.

A content provider may desire to use information associated with users of an operator network to determine targeted content. In some cases, a content provider may collect information associated with a user by using a file (e.g., a cookie) to track a user's interne activity (e.g., web browsing activity, content downloading activity, purchasing activity, etc.). However, a user may configure a user device (e.g., a web browser associated with a user device) to block and/or delete cookies, thereby preventing the content provider from collecting information associated with the user.

Additionally, in some cases, a content provider may use a device identifier (e.g., an Identifier for Advertising (IDFA), or the like) to collect information associated with a user. For example, a content provider may use the device identifier to establish a user profile that includes information associated with a user's Internet activity. However, a user may reset the device identifier, thereby requiring a content provider to rebuild the user's profile.

Additionally, in some cases, an operator network may generate a unique device identifier (e.g., a unique device identifier header (UIDH), or the like) by encoding an identifier associated with the user and/or a key that is valid for a period of time. When the operator network receives a request for content from a user device to be sent to a content server, the operator network may insert the unique device identifier into the request for content and may provide the request to the content server. Providing the unique device identifier in the request for content may allow the content provider to identify targeted content, associated with the unique device identifier, based on one or more attributes of the user (e.g., an age of the user, a gender of the user, a geographic area of the user, or the like). For example, the content provider may establish a profile for the unique device identifier, and may associate particular attributes of the user with the unique device identifier.

However, if a user uses the user device to send the request for content via another communication method (e.g., a Wi-Fi connection, a wired connection, or the like), then the operator network may not have the opportunity to insert the unique device identifier into the request. Additionally, the operator network may not be able to insert the unique device identifier into some types of traffic, such as hypertext transfer protocol secure (HTTPS) traffic. Thus, the content server may not receive the unique device identifier and/or may not be able to determine targeted content to provide to the user. Additionally, in some cases, a malicious party may intercept the unique device identifier and may use the unique device identifier to establish or determine a profile of a user (e.g., to track a user's Internet activity).

Implementations described herein assist a content provider in securely providing targeted content to a network user. Additionally, implementations described herein enable a content provider to receive a unique device identifier and/or a user segment identifier associated with a user, which may assist the content provider in determining a user profile associated with the user. Additionally, implementations described herein may enable authorized parties to receive the unique device identifier while preventing unauthorized parties from receiving the unique device identifier and/or a user segment identifier, thereby increasing security and/or privacy for users.

FIGS. 1A-1E are diagrams of an overview of an example implementation 100 described herein. As shown in FIG. 1A, and by reference number 105, a user device may request content, such as a webpage, from a content provider server. As shown by reference number 110, the content provider server may provide the content (e.g., the webpage) to the user device. For example, assume that the webpage includes a portion that is reserved for targeted content (e.g., an advertisement that matches demographic information associated with a user).

For example, and as shown by reference number 115, the user device may request targeted content (e.g., based on loading an advertisement tag). As shown by reference number 120, the targeted content server may provide an instruction for the user device to provide information associated with a unique device identifier (e.g., which may assist the targeted content server to identify targeted content for the webpage and for a user of the user device).

Figure 1B:
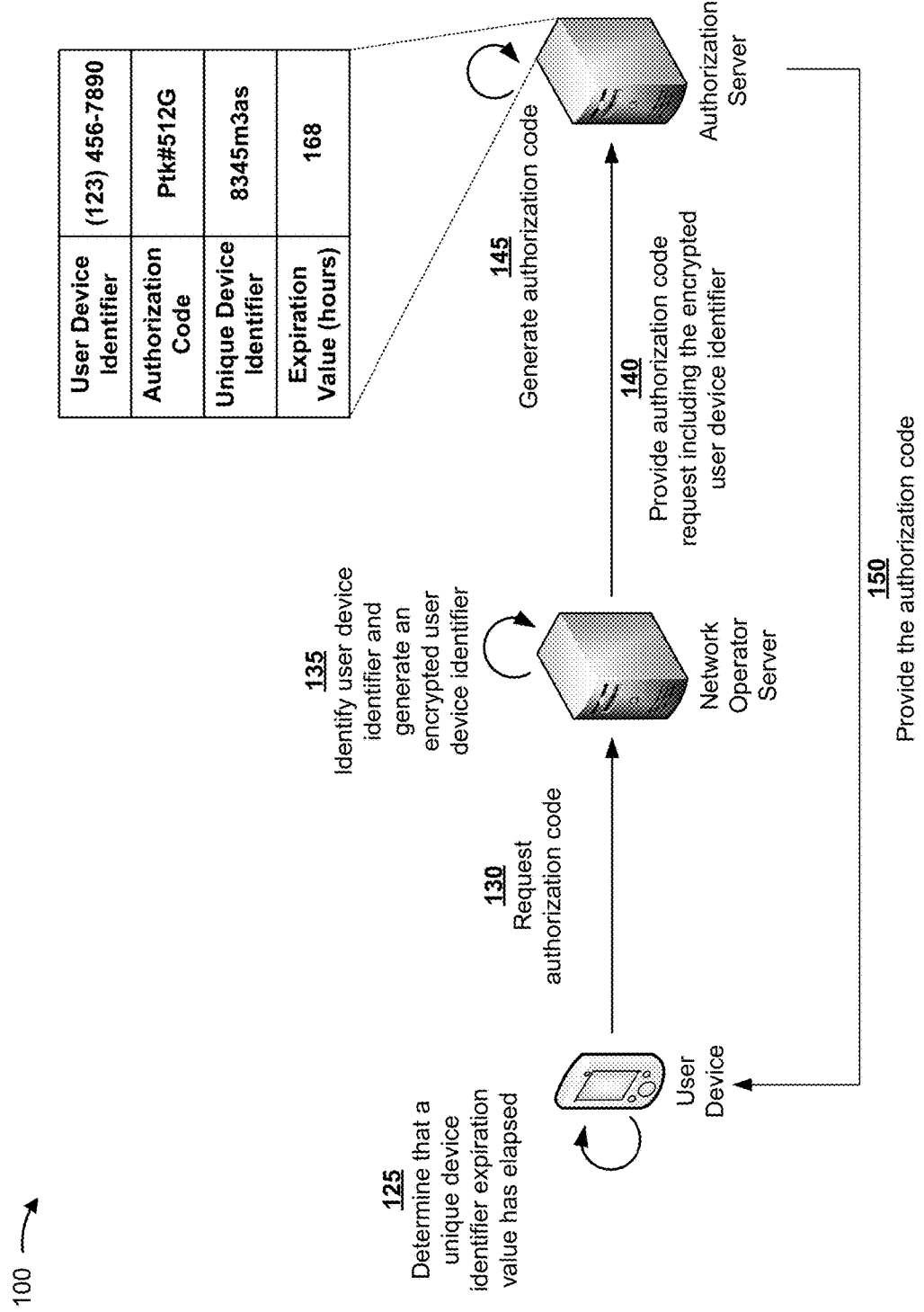

As shown in FIG. 1B, and by reference number 125, the user device may determine that an expiration value associated with the unique device identifier has elapsed (e.g., based on stored information). As shown by reference number 130, the user device may provide, to a network operator server, a request for an authorization code (e.g., based on determining that the unique device identifier has expired). As shown by reference number 135, the network operator server may identify a user device identifier (e.g., a mobile device number (MDN)) associated with the user device and may encrypt the user device identifier. As shown by reference number 140, the network operator server may provide, to an authorization server, an authorization code request including the encrypted user device identifier.

As shown by reference number 145, the authorization server may generate an authorization code. Additionally, the authorization server may generate a unique device identifier (e.g., a new unique device identifier for the user device) and an expiration value. Additionally, as shown, the authorization server may store information (e.g., in a data structure) associating the user device identifier, the authorization code, the unique device identifier, and the expiration value. As shown by reference number 150, the authorization server may provide the authorization code to the user device.

Figure 1C:
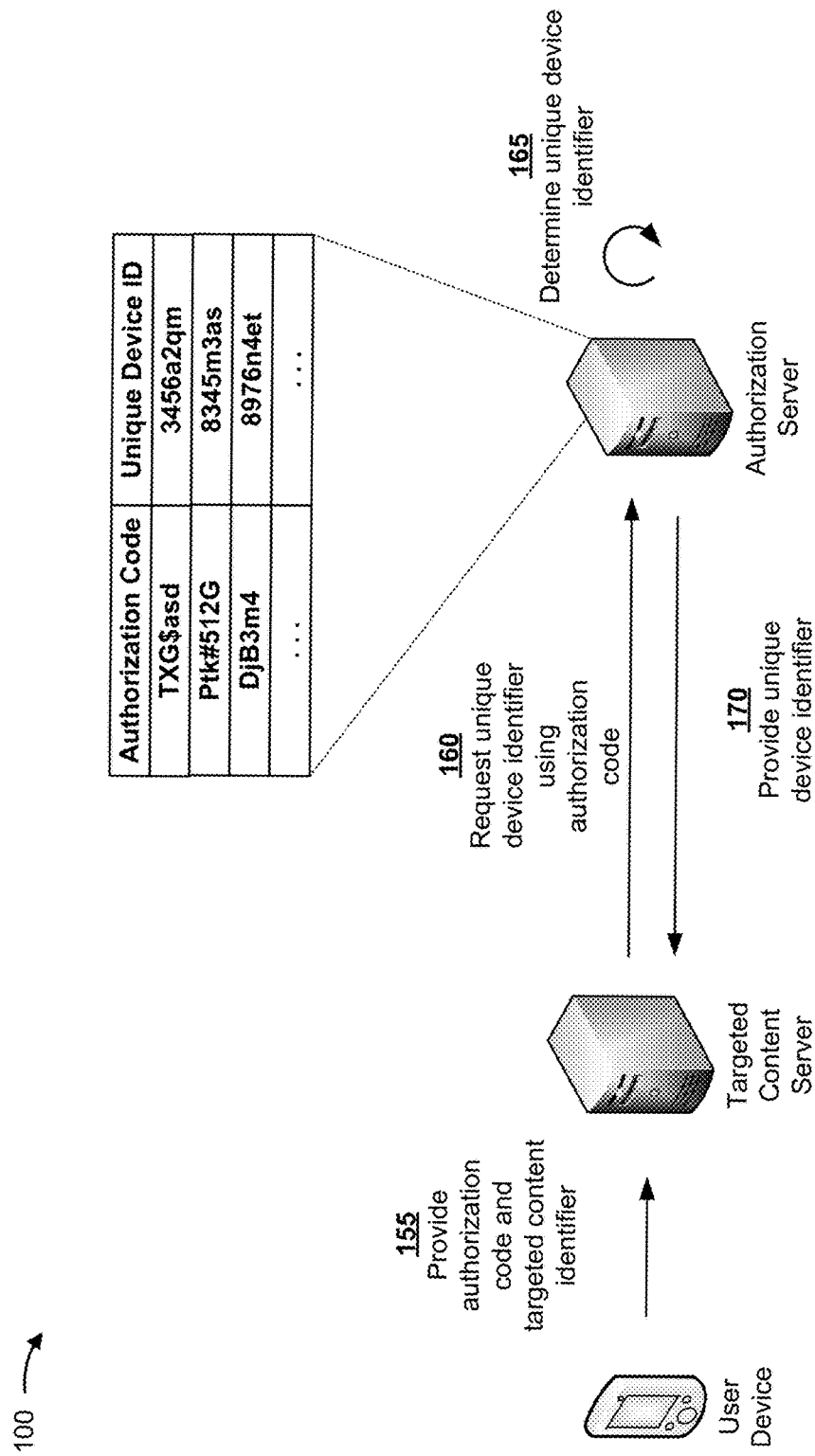

As shown in FIG. 1C, and by reference number 155, the user device may provide a request for targeted content to a targeted content server, and the request may include the authorization code and a targeted content identifier. As shown by reference number 160, the targeted content server may provide, to the authorization server, a request for a unique device identifier associated with the user device. The request for the unique device identifier may include the authorization code, which the authorization server may use to determine the unique device identifier (e.g., by querying a data structure), as shown by reference number 165. As shown by reference number 170, the authorization server may provide the unique device identifier to the targeted content server.

Figure 1D:
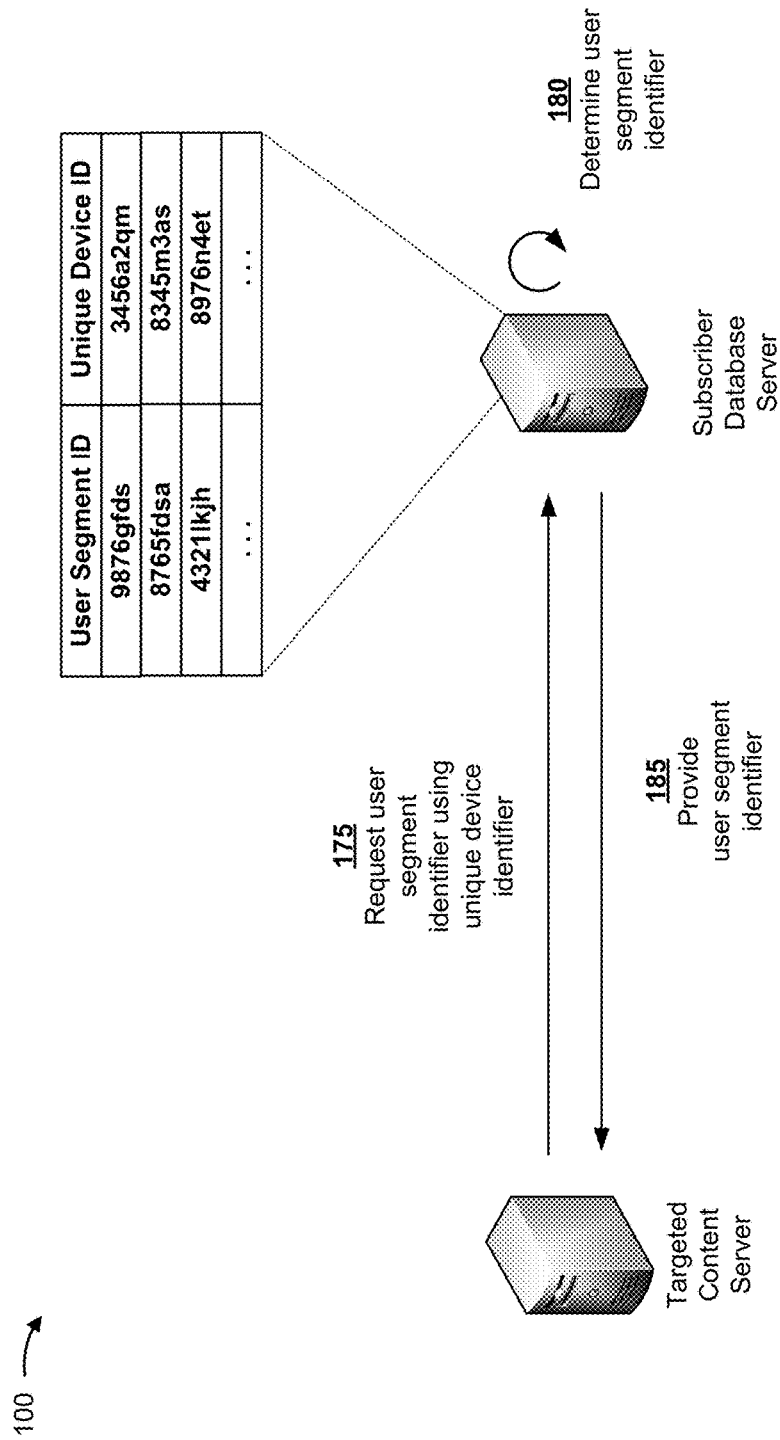

As shown in FIG. 1D, and as shown by reference number 175, the targeted content server may provide a request for a user segment identifier to a subscriber database server, and the request may include the unique device identifier. As shown by reference number 180, the subscriber database server may determine the user segment identifier associated with the unique device identifier (e.g., by querying a data structure), and may provide the user segment identifier to the targeted content server, as shown by reference number 185.

Figure 1E:
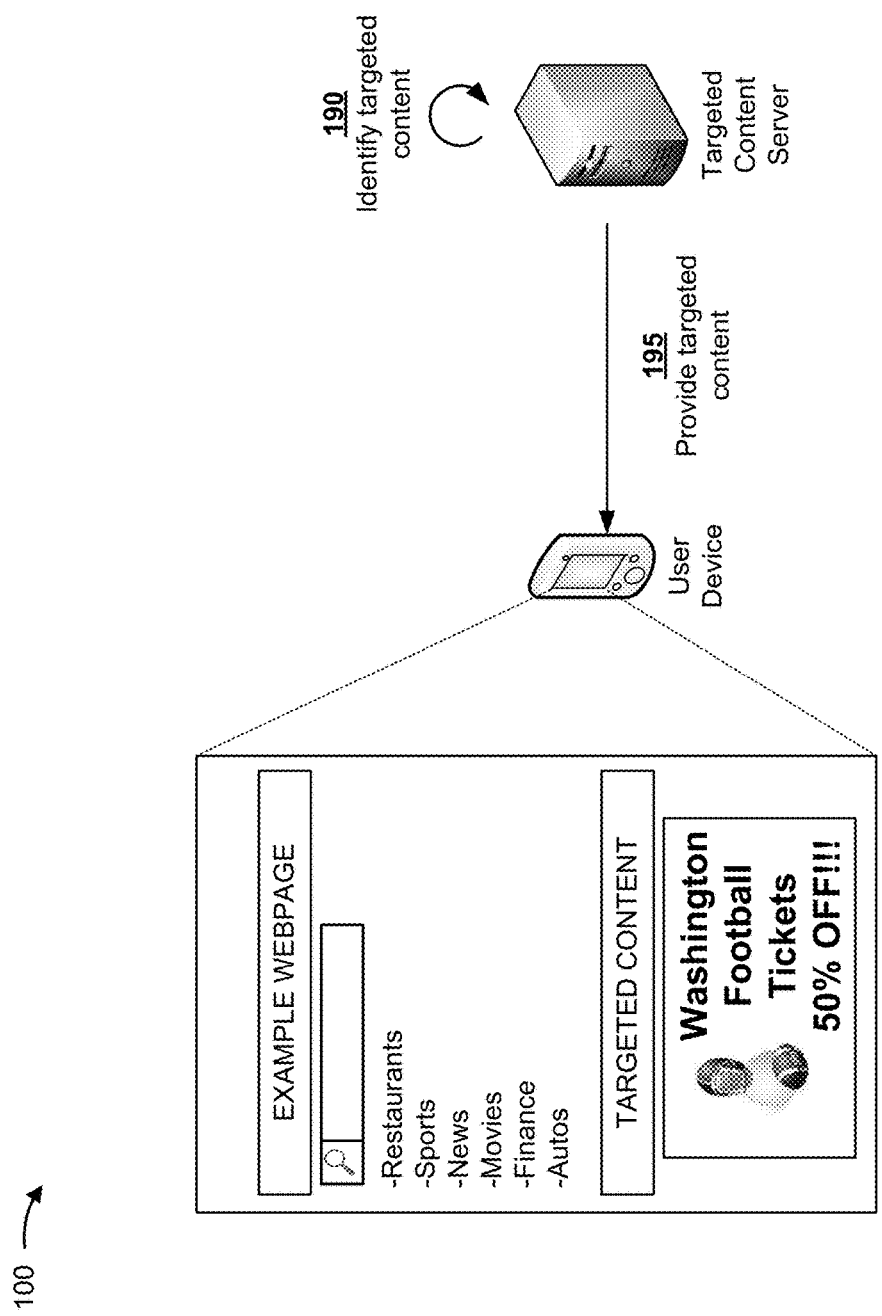

As shown in FIG. 1E, and by reference number 190, the targeted content server may identify targeted content (e.g., based on the user segment identifier, the unique device identifier, the targeted content identifier, or the like). For example, assume that the user segment identifier indicates that a user of the user device is a 30 year old male that lives in Washington. Accordingly, the targeted content server may select targeted content for "Washington Football Tickets 50% Off" based on the user demographic information. As shown by reference number 195, the targeted content server may provide the targeted content to the user device. In this way, the user device may receive the targeted content and may provide the targeted content for display.

Implementations described herein may assist a targeted content server in identifying targeted content to provide to a user device. Additionally, implementations described herein may enable an authorization server to provide one or more identifiers associated with a user to an authorized targeted content server, thereby enhancing security and/or privacy of the one or more identifiers. Additionally, implementations described herein may preserve privacy of a user by providing an identifier that anonymously identifies a user.

Implementations described herein may enable a targeted content server to identify a unique device identifier and/or a user segment identifier without requiring that the unique device identifier be included in every targeted content request. Thus, network operator devices may conserve processor and/or memory resources by not being required to identify each targeted content request from a user device and/or insert a unique device identifier associated with the user device in each targeted content request. In this way, network resources may also be conserved.

Implementations described herein may also conserve user device processor and/or memory resources by enabling the user device to receive targeted content without being required to include a unique device identifier in each targeted content request. Additionally, implementations described herein may allow a user device to receive content that may interest and/or be applicable to a user of the user device. In this way, network resources may be conserved by reducing the provisioning of content in which the user may not have interest and/or may be unable to use.

As indicated above, FIGS. 1A-1E are provided merely as an example. Other examples are possible and may differ from what was described with regard to FIGS. 1A-1E.

Figure 2:
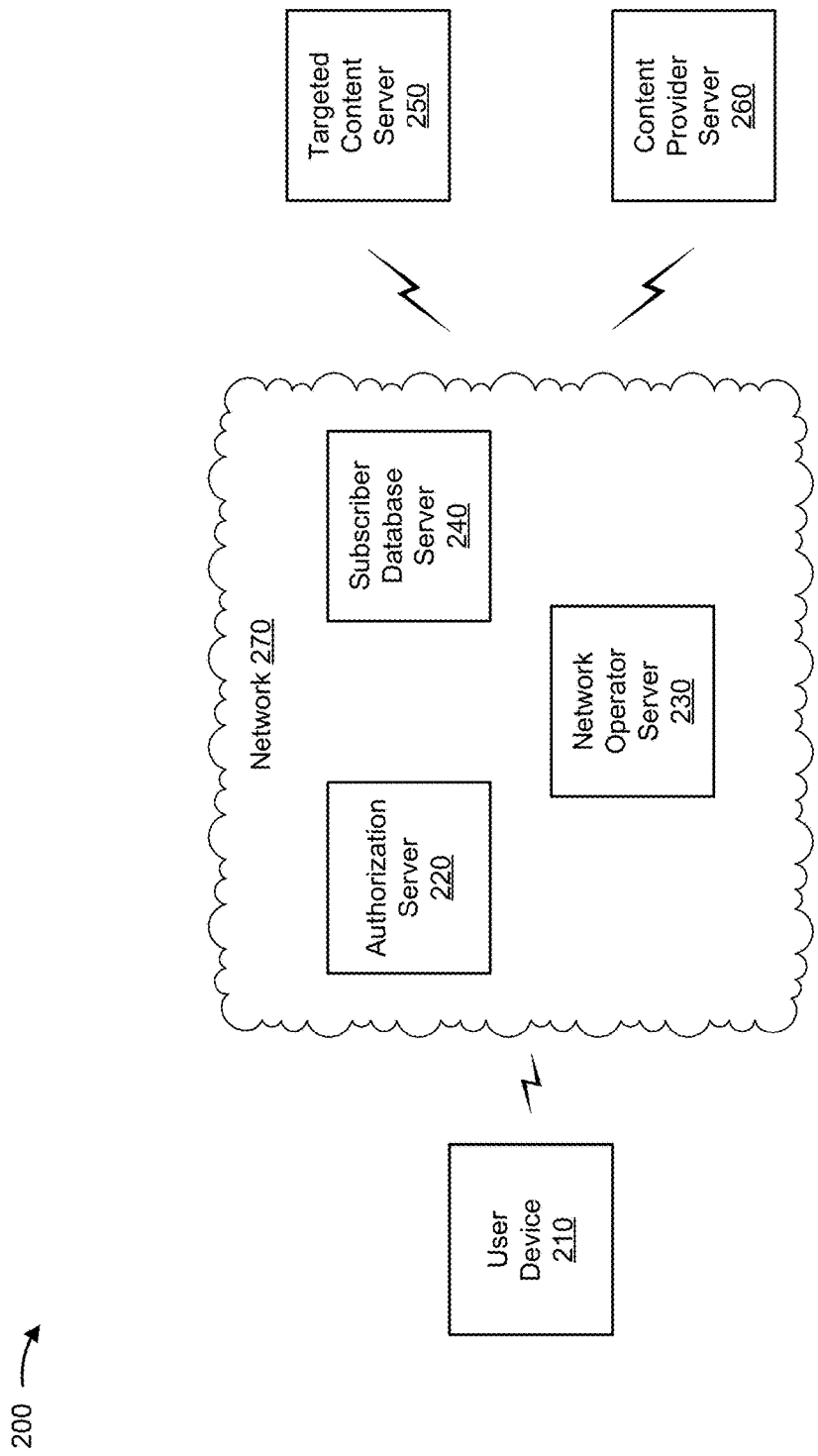
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an authorization server 220, a network operator server 230, a subscriber database server 240, a targeted content server 250, a content provider server 260, and a network 270. Devices of environment 200 may interconnect via wired connections, wireless connections, or a combination of wired and wireless connections.

User device 210 may include one or more devices capable of receiving, generating, storing, processing, and/or providing information associated with targeted content. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may provide information (e.g., an identifier, such as an authorization code, a targeted content identifier, or the like) to targeted content server 250, which may enable targeted content server 250 to determine targeted content.

Authorization server 220 may include one or more server devices capable of receiving, generating, storing, processing, and/or providing information associated with a unique device identifier. For example, authorization server 220 may include a server device, a cloud computing device, or a similar device. In some implementations, authorization server 220 may assist in securely providing targeted content to user device 210, as described in more detail elsewhere herein.

Network operator server 230 may include one or more devices capable of receiving, storing, processing, and/or providing information associated with a request for targeted content. For example, network operator server 230 may include a server device, a cloud computing device, or a similar device. In some implementations, network operator server 230 may identify and/or encrypt a user device identifier of user device 210 which may assist in securely providing targeted content to user device 210, as described in more detail elsewhere herein.

Subscriber database server 240 may include one or more server devices capable of receiving, generating, storing, processing, and/or providing information associated with a user segment identifier. For example, subscriber database server 240 may include a server device, a cloud computing device, or a similar device. In some implementations, subscriber database server 240 may store information (e.g., demographic information, or the like) regarding subscribers associated with a network operator, and may provide the information regarding the subscribers to other devices.

Targeted content server 250 may include one or more devices capable of receiving, storing, processing, and/or providing information associated with targeted content. For example, targeted content server 250 may include a server device, a cloud computing device, or a similar device. Targeted content server 250 may, for example, maintain targeted content, such as advertising content, coupons, rebates, offers, or the like, and may provide the targeted content to user device 210.

Content provider server 260 may include one or more devices capable of providing content. For example, content provider server 260 may include a server device (e.g., a host server, a web server, an application server, etc.), a cloud computing device, or a similar device. For example, content provider server 260 may provide video, audio, images, advertising content, webpages, text, data, and/or some combination thereof. In some implementations, content provider server 260 may provide content to user device 210 that includes a portion associated with targeted content.

Network 270 may include one or more wired and/or wireless networks. For example, network 270 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to user device 210, authorization server 220, network operator server 230, subscriber database server 240, targeted content server 250, and/or content provider server 260. In some implementations, user device 210, authorization server 220, network operator server 230, subscriber database server 240, targeted content server 250, and/or content provider server 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
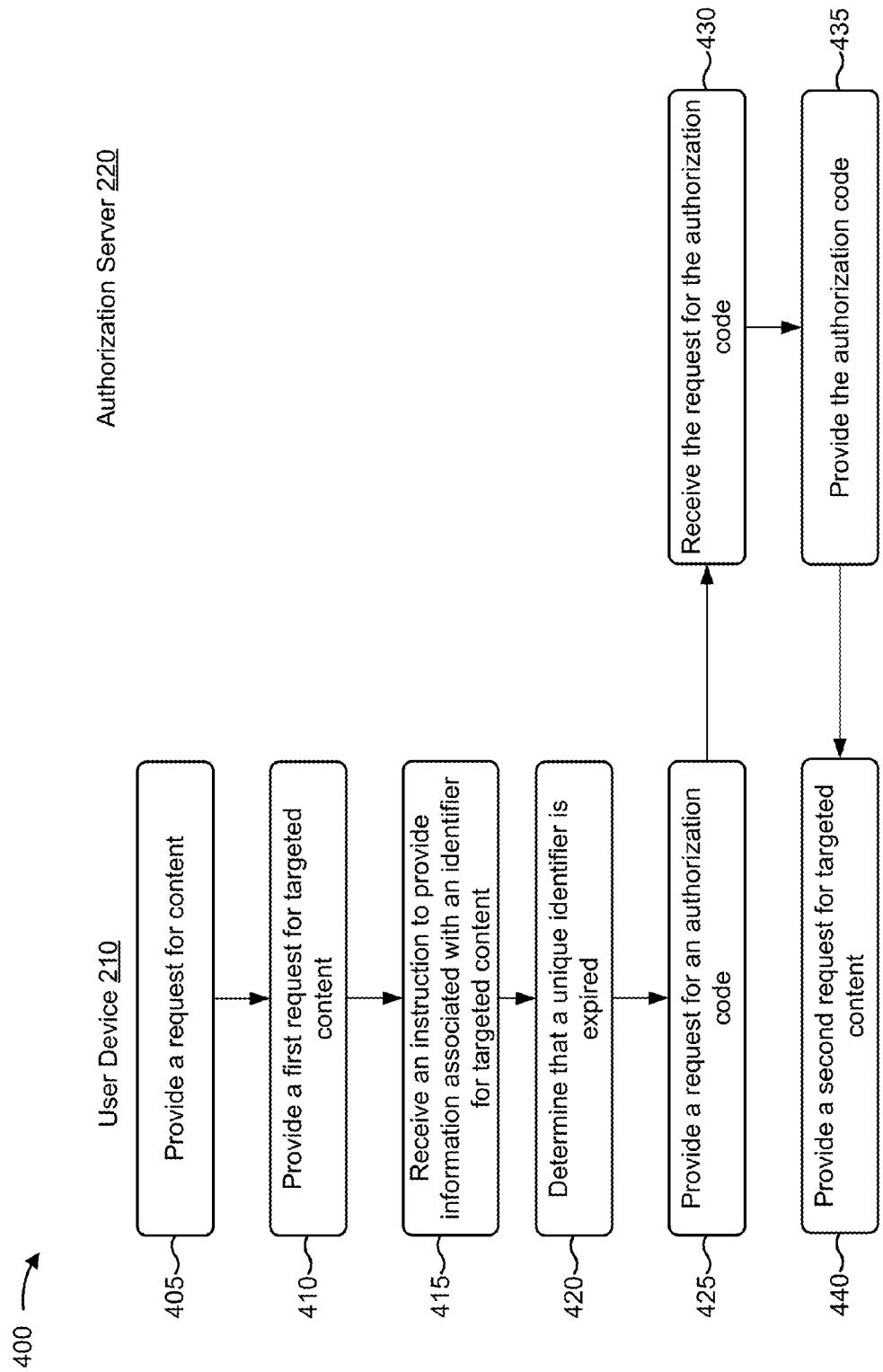
FIGS. 4A and 4B are flow charts of an example process for providing a network-based identity service.
Figure 4B:
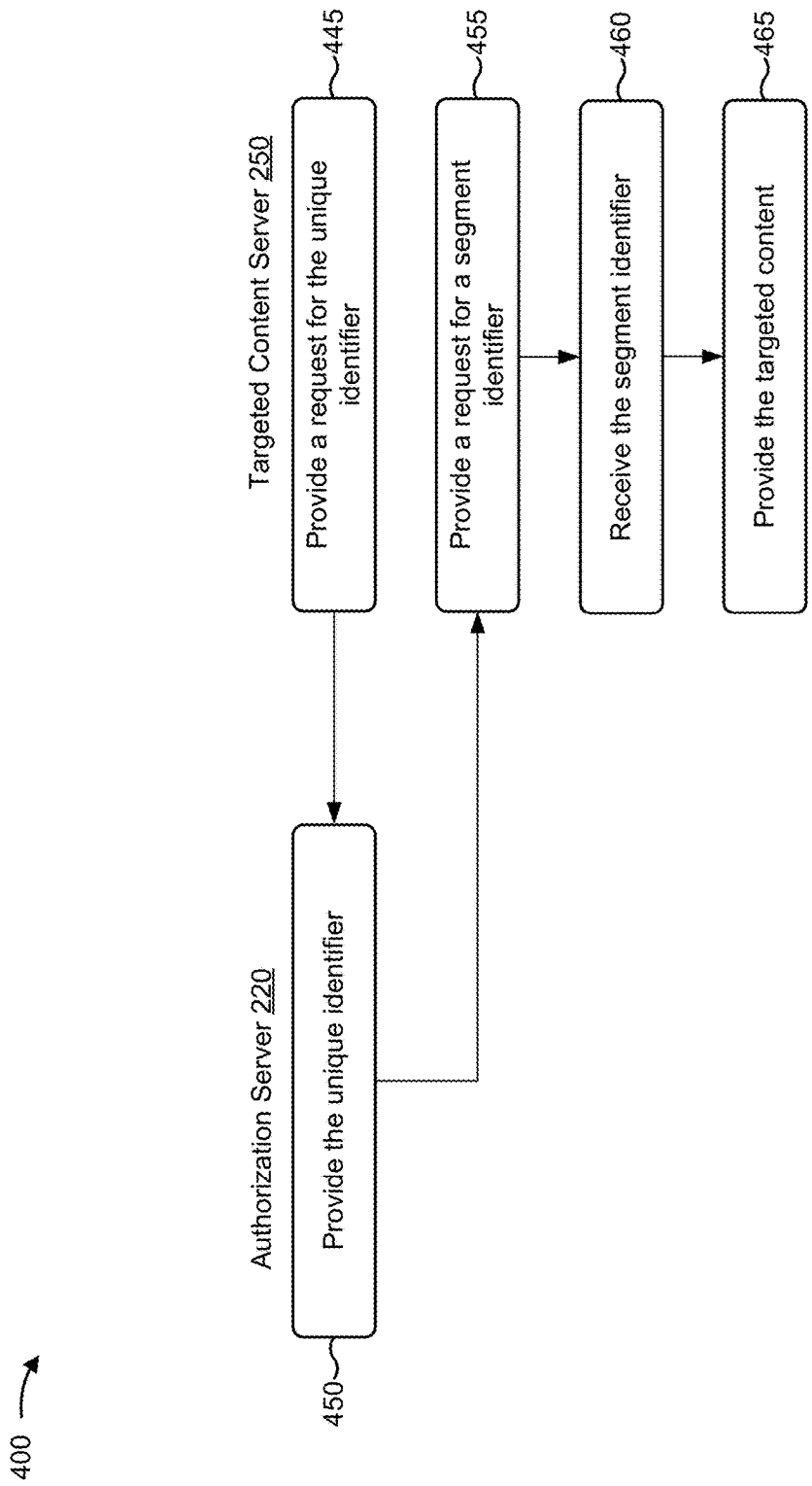

FIGS. 4A and 4B are flow charts of an example process 400 for providing a network-based identity service. In some implementations, one or more process blocks of FIG. 4A and/or FIG. 4B may be performed by user device 210, authorization server 220, and/or targeted content server 250. In some implementations, one or more process blocks of FIG. 4A and/or FIG. 4B may be performed by another device or a group of devices separate from or including user device 210, authorization server 220, and/or targeted content server 250, such as network operator server 230, subscriber database server 240, and/or content provider server 260.

As shown in FIG. 4A, process 400 may include providing a request for content (block 405). For example, user device 210 may provide, to content provider server 260, a request for content. In some implementations, user device 210 may provide an HTTP request for a resource (e.g., a webpage, audio content, video content, etc.) using a resource identifier (e.g., a uniform resource identifier (URI), uniform resource locator (URL), or the like).

In some implementations, content provider server 260 may provide a resource (e.g., a webpage including a hypertext markup language (HTML) file, a JavaScript file, or the like) to user device 210 based on the request for content. In some implementations, the resource may include an advertisement tag (e.g., an ad tag). For example, an ad tag may include HTML and/or JavaScript code that may instruct user device 210 to request targeted content from a particular targeted content server 250. In some implementations, the resource (e.g., webpage) may include a portion that is reserved for targeted content (e.g., an advertisement, image, video, article, or the like to insert into the webpage). For example, targeted content may include content that may be determined based on an attribute of the user (e.g., demographic information, such as an age of the user, a gender of the user, a geographic area of the user, an income level of the user, an interest of the user, or the like).

As further shown in FIG. 4A, process 400 may include providing a first request for targeted content (block 410). For example, user device 210 may provide, to targeted content server 250, a first request for targeted content. In some implementations, user device 210 may provide the first request for targeted content based on loading an ad tag included in a resource provided by content provider server 260.

As further shown in FIG. 4A, process 400 may include receiving an instruction to provide information associated with an identifier for targeted content (block 415). For example, user device 210 may receive an instruction, from targeted content provider server 260, to provide information associated with an identifier for targeted content based on providing the first request for targeted content. In some implementations, the instruction may include a script (e.g., a JavaScript and/or some other type of script), an executable file, and/or some other type of instruction or file that user device 210 may execute.

In some implementations, the instruction to provide information associated with an identifier for targeted content may instruct user device 210 to provide a targeted content identifier. For example, a targeted content identifier may include a character string (e.g., a sequence of alphanumeric characters and/or symbols) that may enable targeted content server 250 to identify an attribute of a user of user device 210.

Additionally, or alternatively, the instruction to provide information associated with an identifier for targeted content may instruct user device 210 to provide an authorization code. For example, an authorization code may include a character string that is valid for a predetermined period of time (e.g., 1 minute, 5 minutes, etc.) and/or is valid for a predetermined quantity of uses (e.g., 1 use, 2 uses, etc.). In some implementations, user device 210 may provide an authorization code to targeted content server 250. The authorization code may enable targeted content server 250 to obtain, from authorization server 220, a unique device identifier associated with user device 210, as described elsewhere herein.

In some implementations, the instruction may cause user device 210 to determine whether a unique device identifier associated with user device 210 is expired. For example, user device 210 may store information identifying an expiration value (e.g., a date and/or time) associated with a unique device identifier. In some implementations, the unique device identifier (e.g., a UIDH, or the like) may correspond to a character string that is valid for a predetermined period of time (e.g., 1 hour, 12 hours, 1 day, 3 days, 7 days, 14 days, etc.).

As further shown in FIG. 4A, process 400 may include determining that a unique device identifier is expired (block 420). For example, user device 210 may determine (e.g., based on stored information) that a unique device identifier, associated with user device 210, is expired based on receiving the information associated with an identifier for targeted content. Additionally, or alternatively, user device 210 may determine that user device 210 does not include information identifying an expiration time and/or date associated with a unique device identifier, and may thus determine (e.g., infer) that the expiration value is expired.

As further shown in FIG. 4A, process 400 may include providing a request for an authorization code (block 425). For example, user device 210 may provide a request, to authorization server 220, for an authorization code based on determining that the unique device identifier is expired.

In some implementations, user device 210 may provide the request for the authorization code via a secure session (e.g., an HTTPS request, or the like). In some implementations, a client credential (e.g., a code, an application programming interface (API) key, or the like) may enable user device 210 and/or targeted content server 250 to communicate with authorization server 220 and/or other devices (e.g., subscriber database server 240, network operator server 230, or the like). Additionally, or alternatively, the client credential may enable authorized devices (e.g., user device 210 and/or targeted content server 250) to receive information (e.g., an authorization code, a unique device identifier, or the like) from authorization server 220, thereby enhancing security and/or privacy of the unique device identifier and/or the authorization code.

In some implementations, network operator server 230 may receive the request for the authorization code, may modify the request, and may provide the request to authorization server 220. For example, network operator server 230 may terminate a secure session between user device 210 and another device (e.g., authorization server 220, targeted content server 250, or the like). In some implementations, network operator server 230 may insert an encrypted user device identifier, that identifies user device 210, into the request (e.g., into a header, a trailer, a payload, or the like). The user device identifier may include, for example, a mobile device number (MDN), an international mobile user identity (IMSI), an international mobile station equipment identify (IMEI), a mobile equipment identifier (MEID), or the like.

In some implementations, network operator server 230 may encrypt the user device identifier (e.g., using an encryption algorithm, a hashing algorithm, or the like) and authorization server 220 may decrypt the user device identifier to identify the user device identifier, as described below.

As further shown in FIG. 4A, process 400 may include receiving the request for the authorization code (block 430). For example, authorization server 220 may receive, from network operator server 230 and/or user device 210, the request for the authorization code. In some implementations, authorization server 220 may identify the user device identifier associated with user device 210.

In some implementations, authorization server 220 may generate an authorization code for a particular user device 210 and/or a particular user based on a key (e.g., generated from a random number, generated based on performing a hash function, or the like) and information associated with user device 210 and/or the user (e.g., a user device identifier (e.g., an MDN, or the like), a user account number, a random number, a user name, or the like).

In some implementations, authorization server 220 may generate a unique device identifier (or an updated unique device identifier) associated with user device 210 based on receiving the request for the authorization code. Additionally, or alternatively, authorization server 220 may generate an expiration value (or an updated expiration value) associated with the unique device identifier based on receiving the request for the authorization code. Additionally, or alternatively, authorization server 220 may store a data structure associating multiple unique device identifiers with corresponding user devices 210 and/or authorization codes.

As further shown in FIG. 4A, process 400 may include providing the authorization code (block 435). For example, authorization server 220 may provide the authorization code to user device 210. Additionally, or alternatively, authorization server 220 may provide, to user device 210, an expiration value of the unique device identifier. User device 210 may receive the expiration value of the unique device identifier and may store information identifying the expiration value. In this way, user device 210 may determine when to request another authorization code, as described in more detail elsewhere herein.

As further shown in FIG. 4A, process 400 may include providing a second request for targeted content (block 440). For example, user device 210 may receive the authorization code and may provide, to targeted content server 250, a second request for targeted content, which may include the authorization code. Additionally, or alternatively, the second request for targeted content may include a targeted content identifier.

In some implementations, targeted content server 250 may receive, from user device 210, the second request for targeted content. Additionally, targeted content server 250 may receive the authorization code from user device 210. In this way, targeted content server 250 may provide, to authorization server 220, the authorization code to obtain a unique device identifier associated with user device 210, as described below.

As shown in FIG. 4B, process 400 may include providing a request for the unique device identifier (block 445). For example, targeted content server 250 may provide, to authorization server 220, a request for the unique device identifier. In some implementations, the request for the unique device identifier may include the authorization code. Additionally, or alternatively, the request for the unique device identifier may include a client credential. In this way, authorization server 220 may provide unique device identifiers to authorized devices, thereby enhancing security and/or privacy of the unique device identifiers.

As further shown in FIG. 4B, process 400 may include providing the unique device identifier (block 450). For example, authorization server 220 may provide a unique device identifier, associated with user device 210, to targeted content server 250 based on receiving the authorization code. In some implementations, authorization server 220 may validate the authorization code (e.g., may determine that the authorization code has not been used, has not been received by authorization server 220, is within an allowable quantity of uses, is not expired, or the like). In some implementations, authorization server 220 may identify (e.g., based on querying a data structure) a unique device identifier associated with the authorization code. In some implementations, targeted content server 250 may receive the unique device identifier from authorization server 220 and may request a segment identifier using the unique device identifier, as described below.

As further shown in FIG. 4B, process 400 may include providing a request for a user segment identifier (block 455). For example, targeted content server 250 may provide, to subscriber database server 240, a request for a user segment identifier. In some implementations, the request for the user segment identifier may include the unique device identifier associated with user device 210.

In some implementations, subscriber database server 240 may store a data structure associating multiple unique device identifiers with corresponding user segment identifiers. For example, a user segment identifier may include a character string that may enable targeted content server 250 to identify one or more attributes associated with a user (e.g., an age of the user, a gender of the user, a geographic location of the user, an internet usage history of the user, a language of the user, preferred content types of the user, preferred genres of the user, a purchase history of the user, or the like). In some implementations, subscriber database server 240 may receive the request for the user segment identifier, and may determine a user segment identifier associated with the unique device identifier (e.g., based on querying a data structure).

As further shown in FIG. 4B, process 400 may include receiving the user segment identifier (block 460). For example, targeted content server 250 may receive the user segment identifier from subscriber database server 240. In this way, targeted content server 250 may identify targeted content to provide to user device 210. For example, targeted content server 250 may identify an attribute associated with a user based on the user segment identifier. Additionally, targeted content server 250 may store a user profile which may include an attribute associated with a user (e.g., an attribute identified by the user segment identifier, targeted content identifier, unique device identifier, and/or the like). In this way, targeted content server 250 may identify targeted content to provide to user device 210.

Additionally, targeted content server 250 may identify targeted content to provide to user device 210 without receiving the unique device identifier in each request for targeted content. In this way, network operator server 230 and/or authorization server 220 may not be required to identify each targeted content request provided by user device 210, identify a user device identifier associated with user device 210, and/or insert a unique device identifier associated with user device 210 in each targeted content request. Thus, processor, memory, and/or network resources may be conserved.

Additionally, in this way, user device 210 may not be required to include the unique device identifier in each targeted content request, thereby conserving user device processor and/or memory resources. Further, implementations described herein may enable user device 210 to receive content that may interest and/or may be applicable to a user of user device 210, thereby conserving network resources by reducing a quantity of content that is provided to user device 210 that is inapplicable to the user.

As further shown in FIG. 4B, process 400 may include providing the targeted content (block 465). For example, targeted content server 250 may provide the targeted content to user device 210. In some implementations, targeted content server 250 may identify targeted content to provide to user device 210. For example, targeted content server 250 may identify targeted content that matches an attribute associated with a user of user device 210 (e.g., an attribute identified by the user segment identifier, the unique device identifier, and/or the targeted content identifier and/or an attribute stored in a user profile identified by the user segment identifier, the targeted content identifier, the unique device identifier, or the like).

In some implementations, targeted content server 250 may provide, to another device (e.g., an advertisement exchange server), information identifying an attribute associated with a user of user device 210. In this way, multiple devices (e.g., advertisement servers) may be associated with bids on an impression (e.g., an event when targeted content is displayed on user device 210). For example, targeted content server 250 may identify targeted content to provide to user device 210 based on a device (e.g., an advertisement server) being associated with a particular bid (e.g., a highest bid).

In this way, user device 210 may receive the targeted content and may provide the targeted content for display. Implementations described herein may assist targeted content server 250 to identify targeted content to provide to user device 210 (e.g., using a unique device identifier, a user segment identifier, or the like). Additionally, implementations described herein may improve security and/or privacy of an identifier (e.g., a unique device identifier, a segment identifier, or the like) by providing the identifier to authorized devices. Implementations described herein may conserve network resources by enhancing security and/or privacy of the unique device identifier.

While process 400 describes subscriber database server 240 as receiving the request for the user segment identifier and providing the user segment identifier, in some implementations, authorization server 220 may receive the request for the user segment identifier and may provide the user segment identifier to targeted content server 250. For example, as described above in connection with block 445, targeted content server 250 may provide authorization server 220 with the authorization code. In some implementations, authorization server 220 may identify a unique device identifier associated with the authorization code, and may provide, to subscriber database server 240, a request for a user segment identifier associated with the unique device identifier. Authorization server 220 may receive the user segment identifier from subscriber database server 240 and may provide the user segment identifier to targeted content server 250. In this way, authorization server 220 may not be required to provide a unique device identifier to targeted content server 250, thereby increasing security and/or privacy of the unique device identifier. Additionally, in this way, network resources may be conserved by reducing a quantity of requests for the user segment identifier.

While process 400 describes authorization server 220 as receiving the request for the authorization code and providing the authorization code to user device 210, in some implementations, authorization server 220 may receive the request for the authorization code and may provide an encrypted user segment identifier to user device 210. For example, as described above in connection with block 425, authorization server 220 may receive a request for an authorization code from user device 210. In some implementations, authorization server 220 may identify the device identifier associated with user device 210 and may determine a unique device identifier associated with user device 210. Additionally, authorization server 220 may provide, to subscriber database server 240, a request for a user segment identifier associated with the unique device identifier.

Additionally, authorization server 220 may encrypt the user segment identifier and may provide the encrypted user segment identifier to user device 210. User device 210 may provide the encrypted segment identifier to targeted content server 250 when requesting the targeted content. Targeted content server 250 may decrypt the encrypted user segment identifier, and may provide targeted content based on the segment identifier. In this way, authorization server 220 may not be required to provide a unique device identifier to targeted content server 250, thereby increasing security and/or privacy of the unique device identifier. Additionally, network resources may be conserved by reducing a quantity of requests for the unique device identifier and/or the user segment identifier.

While process 400 describes authorization server 220 as receiving the request for the authorization code and providing the authorization code to user device 210, in some implementations, authorization server 220 may receive the request for the authorization code and may provide an encrypted unique device identifier to user device 210. For example, as similar as described above in connection with providing an encrypted user segment identifier to user device 210, authorization server 220 may encrypt the unique device identifier, and may provide the encrypted unique device identifier to user device 210. Targeted content server 250 may receive the encrypted unique device identifier and may decrypt the unique device identifier. In this way, authorization server 220 may receive a reduced quantity of requests (e.g., for an authorization code, for a unique device identifier, etc.), thereby conserving processor and/or memory resources and/or conserving network resources.

While process 400 describes user device 210 as providing the second request, for targeted content, that includes the authorization code and the targeted content identifier, in some implementations, user device 210 may provide the second request for targeted content that includes the targeted content identifier and does not include the authorization code. For example, assume that user device 210 receives an authorization code and an expiration value associated with a unique device identifier, and provides a request, including the authorization code, for targeted content to targeted content server 250. Further, assume that user device 210 provides another request for targeted content (e.g., before the expiration value associated with the unique device identifier elapses).

For example, as described above in connection with block 420, assume that user device 210 determines that the expiration value associated with the unique device identifier has not elapsed. In this case, user device 210 may not request another authorization code (e.g., because targeted content server 250 may already have information identifying a unique device identifier associated with user device 210). In this way, a quantity of requests for authorization codes may be reduced, thereby conserving network resources and/or reducing latency. Additionally, in this way, user device 210, network operator server 230, and/or authorization server 220 may not be required to provide information associated with the unique device identifier, thereby conserving processor, memory, and/or network resources.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5:
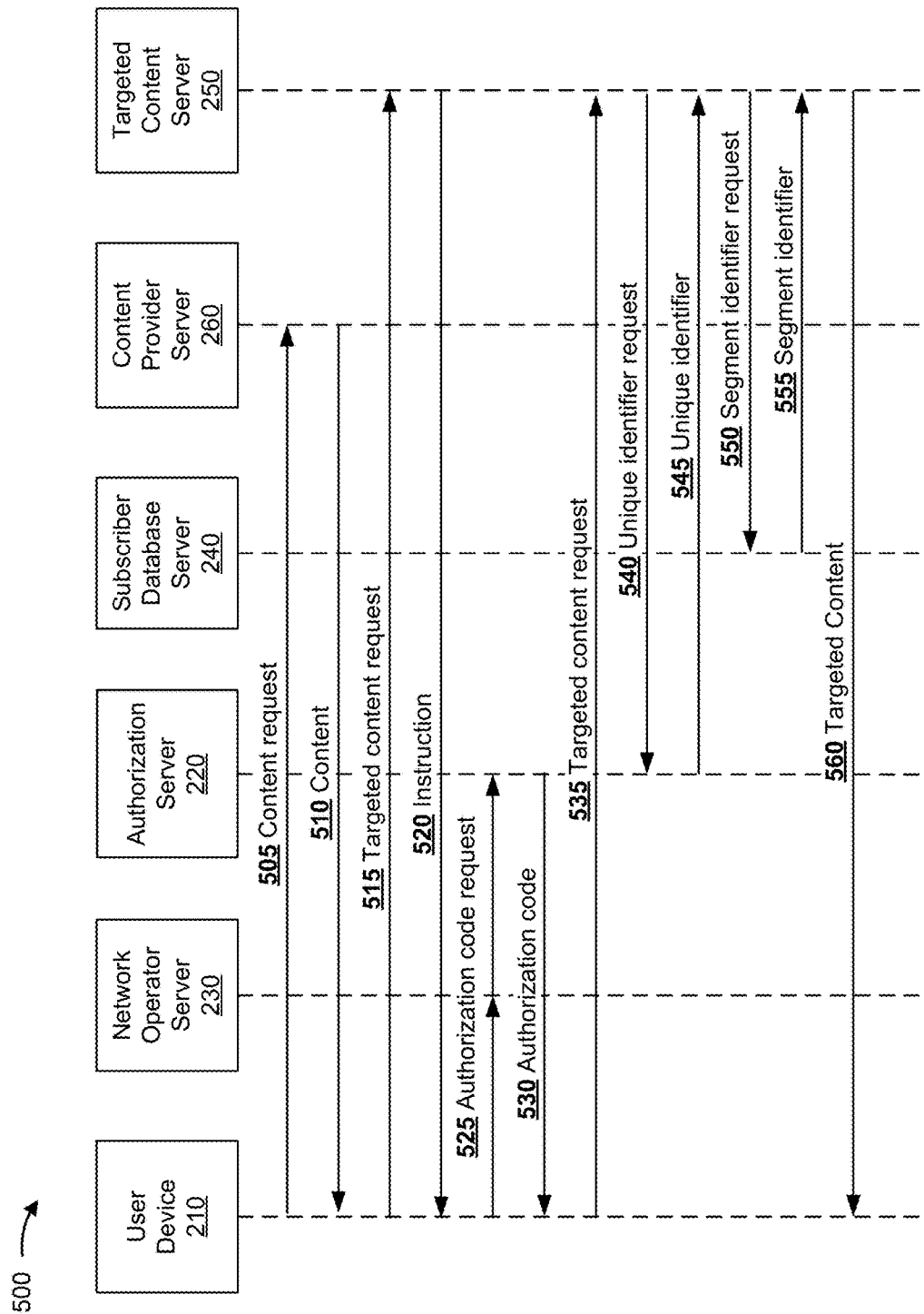
FIG. 5 is a diagram of an example call flow of example operations capable of being performed by one or more devices of FIG. 2.

FIG. 5 is a diagram of an example call flow 500 of example operations capable of being performed by one or more devices of FIG. 2. As shown in FIG. 5, and by reference number 505, user device 210 may provide a content request, such as an HTTPS request, to content provider server 260. As shown by reference number 510, content provider server 260 may provide content, such as a webpage with an ad tag, to user device 210. As shown by reference number 515, user device 210 may provide a request for targeted content, such as another HTTPS request, to targeted content server 250 based on loading the ad tag. As shown by reference number 520, targeted content server 250 may provide an instruction to user device 210, such as an executable script. The instruction may cause user device 210 to provide an authorization code and a targeted content identifier to targeted content server 250.

In example call flow 500, assume that user device 210 determines that an expiration value associated with a unique device identifier has elapsed. In this case, and as shown by reference number 525, user device 210 may provide, to authorization server 220, a request for an authorization code. Network operator server 230 may intercept the request for the authorization code, and may insert an encrypted user device identifier, such as an encrypted MDN of user device 210, within a header of the request. Authorization server 220 may decrypt the encrypted MDN to identify user device 210, may generate the authorization code and/or a unique device identifier for user device 210, and may associate the authorization code and the unique device identifier in a data structure. In this way, targeted content server 250 may request the unique device identifier from authorization server 220 using the authorization code, as described below.

As shown by reference number 530, authorization server 220 may provide the authorization code to user device 210. As shown by reference number 535, user device 210 may provide another request for targeted content, including the authorization code and a targeted content identifier, to targeted content server 250. As shown by reference number 540, targeted content server 250 may provide the authorization code to authorization server 220 along with a request for a unique device identifier associated with user device 210. As shown by reference number 545, authorization server 220 may use the authorization code to identify the unique device identifier (e.g., using the data structure described above), and may provide the unique device identifier to targeted content server 250.

As shown by reference number 550, targeted content server 250 may provide the unique device identifier to subscriber database server 240 along with a request for a user segment identifier associated with user device 210 (e.g., associated with a user of user device 210). As shown by reference number 555, subscriber database server 240 may use the unique device identifier to identify a user segment identifier associated with user device 210 (e.g., by querying a data structure), and may provide the user segment identifier to targeted content server 250. Targeted content server 250 may use the user segment identifier to identify one or more attributes and/or a user profile associated with a user of user device 210. As shown by reference number 560, targeted content server 250 may provide targeted content to user device 210.

In some implementations, targeted content server 250 may not provide the request for the user segment identifier. For example, a unique device identifier may expire more quickly than a user segment identifier (e.g., a user segment identifier may not change as frequently as a unique device identifier). Thus, targeted content server 250 may receive a new (e.g., updated) unique device identifier(s), and may not need to update a user segment identifier associated with the updated unique device identifier(s). For example, targeted content server 250 may update a user profile with an updated unique device identifier and may associate the updated unique device identifier with an existing targeted content identifier and/or an existing user segment identifier (e.g., may not need to request a user segment identifier).

While a particular series of operations and/or data flows have been described above with regard to FIG. 5, the order of the operations and/or data flows may be modified in other implementations. Further, non-dependent operations may be performed in parallel.

Implementations described herein may assist a content provider in providing targeted content to a network user. Additionally, implementations described herein may enable a content provider to receive a unique device identifier associated with a user, which may assist the content provider in determining a user profile associated with the user. Additionally, implementations described herein may enable authorized parties to receive the unique device identifier, thereby increasing security and/or privacy of the unique device identifier.

Implementations described herein may conserve network, processor, and/or memory resources by enabling a targeted content server to identify targeted content without requiring that a user device and/or a network device provide a unique device identifier with each targeted content request.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
a memory storing instructions; and
one or more processors to execute the instructions to:
receive, based on a first unique device identifier associated with a subscriber of a network being expired, a request for an authorization code associated with providing content to a second device,
the request for the authorization code being received from the second device;
generate a particular authorization code for the second device;
provide the particular authorization code to the second device;
receive a request for a second unique device identifier corresponding to the particular authorization code,
the request for the second unique device identifier being received from a third device that is different from the second device,
the request for the second unique device identifier including the particular authorization code, and
the second unique device identifier being associated with the subscriber,
the subscriber being associated with the second device;
validate the particular authorization code; and
provide the second unique device identifier, associated with the particular authorization code, to the third device based on receiving the request for the second unique device identifier and based on validating the particular authorization code,
the third device being associated with providing the content to the second device,
the content being targeted to the subscriber based on the second unique device identifier, and
the content being identified based on the content matching an attribute associated with the second unique device identifier.

2. The first device of claim 1, where the one or more processors are further to:
generate an expiration value associated with the second unique device identifier; and
where the one or more processors, when providing the particular authorization code to the second device, are to:
provide the expiration value associated with the second unique device identifier to the second device, the expiration value including information identifying when to provide a request for another authorization code.

3. The first device of claim 1, where the request for the authorization code includes a user device identifier,
the user device identifier being associated with the second device; and
where the one or more processors are further to:
store the user device identifier in association with the particular authorization code.

4. The first device of claim 3, where the request for the authorization code is received from a fourth device,
the fourth device receiving the request from the second device and encrypting the user device identifier; and
where the one or more processors are further to:
decrypt the user device identifier; and
identify the user device identifier based on decrypting the user device identifier.

5. The first device of claim 1, where the one or more processors are further to:
generate the second unique device identifier based on receiving the request for the authorization code.

6. The first device of claim 1, where the one or more processors are further to:
identify a user device identifier, associated with the second device, based on receiving the request for the authorization code;
determine the second unique device identifier,
the second unique device identifier being different from the user device identifier;
determine a user segment identifier associated with the second unique device identifier,
the user segment identifier being associated with one or more attributes of the subscriber,
the user segment identifier being different from the second unique device identifier and the user device identifier; and
provide the user segment identifier to the third device.

7. A non-transitory computer-readable medium storing instructions, the instructions comprising:
one or more instructions that, when executed by one or more processors of a first device, cause the one or more processors to:
receive, based on a first unique device identifier associated with a subscriber of a network being expired, a request for an authorization code associated with providing content to a second device,
the request for the authorization code being provided by the second device;
generate a particular authorization code for the second device;
provide the particular authorization code to the second device based on receiving the request for the authorization code;
receive a request for a second unique device identifier corresponding to the second device,
the request for the second unique device identifier being provided by a third device that is different from the second device,
the request for the second unique device identifier including the particular authorization code, and
the second unique device identifier being associated with a user of the second device;
validate the particular authorization code; and
provide the second unique device identifier, associated with the particular authorization code, to the third device based on receiving the request for the second unique device identifier and based on validating the particular authorization code,
the third device being associated with providing the content to the second device,
the content being targeted to the user based on the second unique device identifier, and
the content being identified based on the content matching an attribute associated with the user.

8. The non-transitory computer-readable medium of claim 7, where the one or more instructions, when executed by the one or more processors, further cause the one or more processors to:
generate an expiration value associated with the second unique device identifier; and
where the one or more instructions, that cause the one or more processors to provide the particular authorization code to the second device, cause the one or more processors to:
provide the expiration value associated with the second unique device identifier to the second device,
the expiration value including information identifying when to request a new authorization code.

9. The non-transitory computer-readable medium of claim 7, where the request for the authorization code includes a user device identifier; and
where the one or more instructions, when executed by the one or more processors, further cause the one or more processors to:
store the user device identifier in association with the authorization code.

10. The non-transitory computer-readable medium of claim 9, where the request for the authorization code is received from a fourth device,
the fourth device identifying the user device identifier and encrypting the user device identifier.

11. The non-transitory computer-readable medium of claim 7, where the one or more instructions, when executed by the one or more processors, further cause the one or more processors to:
identify a user device identifier, associated with the second device, based on receiving the request for the authorization code; and
determine the second unique device identifier,
the second unique device identifier being different from the user device identifier.

12. The non-transitory computer-readable medium of claim 7, where the one or more instructions, when executed by the one or more processors, further cause the one or more processors to:
generate the second unique device identifier based on receiving the request for the authorization code;
generate an expiration value associated with the second unique device identifier; and
where the one or more instructions, that cause the one or more processors to provide the particular authorization code to the second device, cause the one or more processors to:
provide information identifying the expiration value associated with the second unique device identifier.

13. The non-transitory computer-readable medium of claim 7, where the one or more instructions, when executed by the one or more processors, further cause the one or more processors to:
identify a segment identifier associated with the second unique device identifier; and
provide the segment identifier to the third device,
the segment identifier enabling the third device to identify the content.

14. A method, comprising:
providing, by a first device, a request for content,
the request for the content being provided to a second device, and
the content including a portion being associated with targeted content,
the targeted content being targeted to a user of the first device;
receiving, by the first device, an instruction based on providing the request for the content;
determining, by the first device and based on receiving the instruction, that an expiration value associated with a unique device identifier has elapsed,
the unique device identifier being associated with the user of the first device;
providing, by the first device and based on determining that the expiration value associated with the unique device identifier has elapsed, a request for an authorization code,
the request for the authorization code being provided to a third device; receiving, by the first device, the authorization code,
the authorization code being associated with the unique device identifier based on the authorization code being validated;
providing, by the first device, a request for the targeted content,
the request for the targeted content being provided to a fourth device, and
the request for the targeted content including the authorization code,
the targeted content being identified based on the targeted content matching an attribute associated with the user; and
receiving, by the first device, the targeted content,
the targeted content being provided by the fourth device.

15. The method of claim 14, further comprising:
determining that the expiration value associated with the unique device identifier has not elapsed; and
providing a second request for the targeted content,
the second request for the targeted content not including the authorization code based on determining that the expiration value associated with the unique device identifier has not elapsed.

16. The method of claim 14, further comprising:
receiving information identifying the expiration value associated with the unique device identifier,
the information being provided by the third device, and
the expiration value identifying when to provide the request for the authorization code.

17. The method of claim 14, further comprising:
receiving information associated with the expiration value;
storing the information associated with the expiration value; and
where determining that the expiration value has elapsed comprises:
determining that the expiration value has elapsed based on the stored information.

18. The method of claim 14, where the request for the targeted content includes a targeted content identifier,
the targeted content identifier identifying the attribute associated with the user.

19. The method of claim 14, further comprising:
receiving the content from the second device, the content including an advertisement tag; and
where receiving the instruction comprises:
    receiving the instruction based on loading the advertisement tag.

20. The first device of claim 1, where the one or more processors, when validating the particular authorization code, are to:
    validate the particular authorization code based on determining that the particular authorization code:
        has not been used,
        has been received by the first device,
        satisfies a threshold quantity of uses, or is not expired.

\* \* \* \* \*